United States Patent [19]

Austin

[11] Patent Number: 5,700,068
[45] Date of Patent: Dec. 23, 1997

[54] POSITIONING APPARATUS FOR INERTIAL SENSORS

[75] Inventor: Barry G. Austin, Marshall, Mich.

[73] Assignee: Tekonsha Engineering Company, Tekonsha, Mich.

[21] Appl. No.: 543,356

[22] Filed: Oct. 16, 1995

[51] Int. Cl.$^6$ ............................................. B60T 8/18
[52] U.S. Cl. ..................... 303/24.1; 33/391; 73/514.36
[58] Field of Search .................... 303/24.1, 9.67, 303/9.68, 20; 188/1.11, 112 A, 158, 181 A; 340/669; 33/308, 309, 366, 391; 73/514.36, 514.37, 514.21, 514.22, 514.23, 514.19, 514.26

[56] References Cited

U.S. PATENT DOCUMENTS

| | | | |
|---|---|---|---|
| 2,228,631 | 1/1941 | Kuiper | 188/3 |
| 2,343,063 | 2/1944 | Kent | 73/514.36 X |
| 3,601,794 | 8/1971 | Blomenkamp et al. | 340/62 |
| 3,738,710 | 6/1973 | Pokinchak | 303/20 |
| 3,780,832 | 12/1973 | Marshall | 188/3 R |
| 3,897,979 | 8/1975 | Vangalis et al. | 303/24 BB |
| 3,908,782 | 9/1975 | Lang et al. | 180/103 |
| 3,909,075 | 9/1975 | Pittet, Jr. et al | 303/24 C |
| 3,953,084 | 4/1976 | Pittet, Jr. et al. | 303/24 R |
| 3,955,652 | 5/1976 | Nilsson et al. | 188/112 |
| 3,967,863 | 7/1976 | Tomecek et al. | 303/24 C |
| 3,981,542 | 9/1976 | Abrams et al | 303/20 |
| 3,981,544 | 9/1976 | Tomecek et al. | 303/21 |
| 4,030,756 | 6/1977 | Eden | 303/24 A |
| 4,050,550 | 9/1977 | Grossner et al. | 188/112 |
| 4,084,859 | 4/1978 | Bull et al. | 303/106 |
| 4,277,895 | 7/1981 | Wiklund | 33/366 |
| 4,295,687 | 10/1981 | Becker et al. | 303/20 |
| 4,398,252 | 8/1983 | Frait | 364/426 |
| 4,495,814 | 1/1985 | Steinke | 73/514.37 |
| 4,660,418 | 4/1987 | Greenwood et al. | 73/514 |
| 4,721,344 | 1/1988 | Frait et al. | 303/20 |
| 4,726,627 | 2/1988 | Frait et al. | 303/24 R |
| 4,849,655 | 7/1989 | Bennett | 307/309 |
| 4,856,850 | 8/1989 | Aichele et al. | 303/20 |
| 5,032,821 | 7/1991 | Domanico et al. | 340/440 |
| 5,050,937 | 9/1991 | Eccleston | 303/7 |
| 5,058,960 | 10/1991 | Eccleston et al. | 303/24.1 |
| 5,149,176 | 9/1992 | Eccleston | 303/20 |

*Primary Examiner*—Josie Ballato
*Attorney, Agent, or Firm*—Price, Heneveld, Cooper, DeWitt & Litton

[57] ABSTRACT

An inertial sensor of the type having an inertially responsive pendulum and a rigid support structure for operatively supporting the pendulum, includes an improved pendulum attitude adjustment assembly which allows precise adjustment of the verticality of the pendulum. The rigid support structure includes a base portion and a pendulum mount portion which is pivotally attached to the base portion. The base is secured at a fixed location and at a fixed attitude relative to the housing. The pendulum is attached at one end to the pendulum mount portion and another end of the pendulum is free to move in response to inertial forces. The attitude adjustment assembly includes an adjustment shaft which is operably coupled to the pendulum mount portion to achieve rotation of the pendulum mount portion with respect to the base portion through a first angle when the adjustment shaft is rotated through an angle greater than the first angle. The pendulum mount portion is preferably rotatable with respect to the base portion through an angle in excess of ninety degrees, and the adjustment shaft has a threaded coupling arrangement which preferably requires rotation of the shaft through a number of degrees in order to rotate the pendulum mount portion a single degree relative to the base portion, thereby providing a desirably high order of resolution while also achieving ease and convenience of operation.

17 Claims, 4 Drawing Sheets

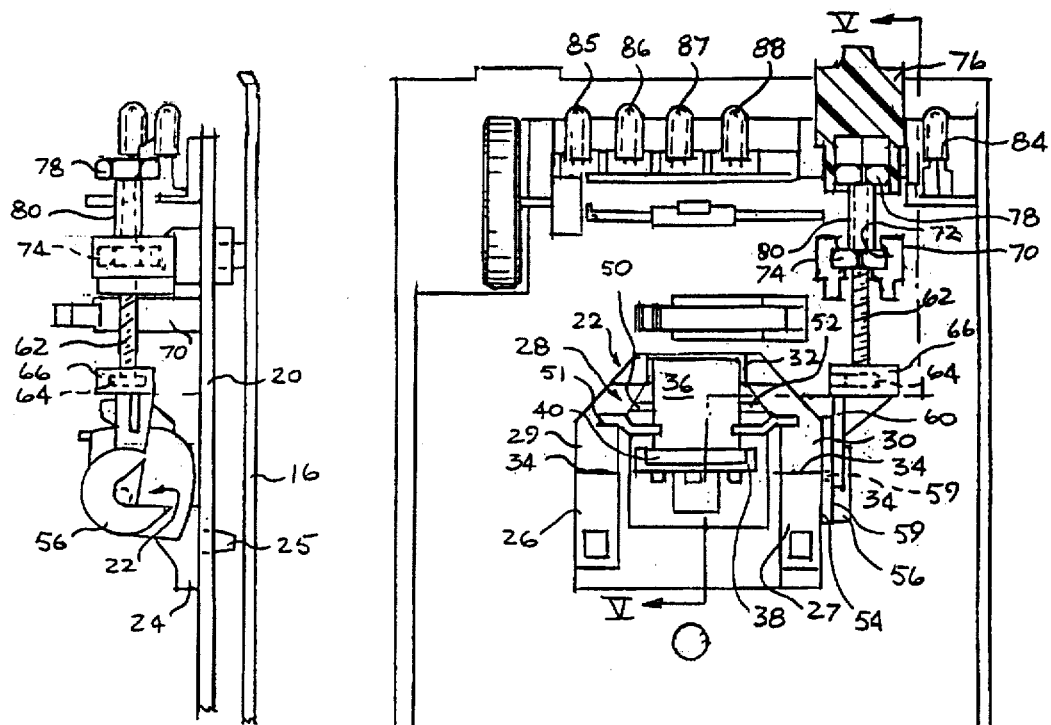
FIG. 4
FIG. 3
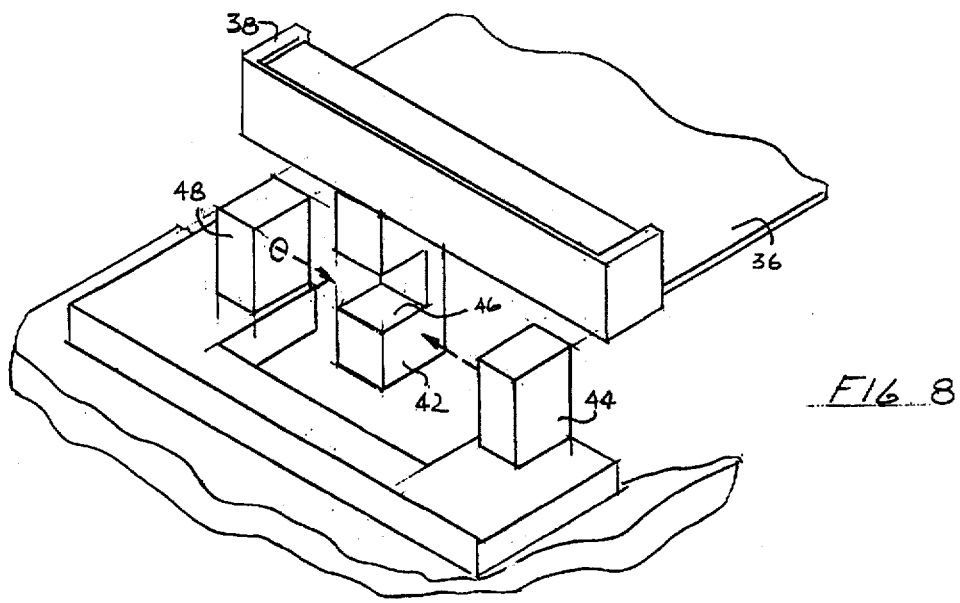
FIG. 8

5,700,068

1

POSITIONING APPARATUS FOR INERTIAL SENSORS

BACKGROUND OF INVENTION

This invention relates generally to inertial sensors and more particularly to inertial sensors or accelerometers which are used to automatically operate the brakes of a trailer or other towed vehicle.

Inertial sensors or accelerometers are well known and at least certain types thereof are commonly used to detect deceleration of the towing vehicle and to automatically actuate and control brakes in a trailer or other towed vehicle in response to detected amounts of such deceleration. These accelerometers generally rely on a pendulum-type inertial member which swings or flexes in the direction of movement of the towing and towed vehicle upon deceleration thereof. Means are provided for detecting the magnitude of such pendulum movement and actuating the brakes of the towed vehicle in an appropriate manner.

One of the most effective such type of inertial sensor or accelerometer application in use today is that generally shown in U.S. Pat. Nos. 3,967,863 and 3,981,544, which are assigned to the Assignee of the present invention. Furthermore, U.S. Pat. No. 5,058,960, also assigned to the Assignee of the present invention, discloses additional refinements primarily relating to an improved method of suspending a multiple-layer, elastically deformable pendulum using an adhesive connection directly between a rigid support and one side of the multiple-layer pendulum, whereby damped but unrestricted floating movement of the different layers of the pendulum longitudinally with respect to one another during flexure of the pendulum is achieved to provide smoother and more controlled braking action. In addition, this patent discloses a rigid support structure having a flexible hinge which allows the position of a pendulum-mounting portion to be changed with respect to that of a base portion in order to correct for non-verticality of the pendulum when mounted in an actual operating environment. Verticality adjustment of the pendulum is achieved by rotating a knob which is essentially directly coupled to the pendulum-mounting portion through parallel shafts which are eccentrically and rigidly connected together.

Accordingly, while providing a fundamental and important improvement in pendulum-type accelerometer mountings, U.S. Pat. No. 5,058,960 utilized a basically conventional structure to adjust the attitude of the pendulum (i.e., verticality) which was inherently difficult to precisely control because of the difficulty of manually rotating a knob with the desired degree of accuracy, especially when relatively tiny increments of motion are necessary, due to the one-to-one correspondence between the angular displacement of the knob and that of the pendulum. For example, with a direct coupling between the knob and the pendulum mount, wherein the angular displacement of the pendulum is equal to that of the knob, a one degree adjustment in the position of the pendulum requires that the knob be rotated by only one degree. Thus, even if the adjustment knob is relatively large, i.e., three-fourths inch in diameter, an adjustment of one degree equates to a knob rotation of only about six one-thousandths of an inch. Such precise movement of a manual knob is at best very difficult, if not impossible for many or even most people. Accordingly, there remains a need for an improved pendulum attitude-adjustment assembly, wherein precise adjustments of the pendulum can be easily achieved.

SUMMARY OF THE INVENTION

This invention provides a significantly improved inertial sensor mount having an attitude-adjustment assembly which provides precise adjustability of the verticality of the inertial member so that optimum performance of the inertial sensor can be achieved irrespective of the particular angle at which the inertial sensor is mounted to a dashboard or the like of a towing vehicle. In particular, the attitude-adjustment assembly of the invention allows easy and precise adjustment of the inertial member vertical attitude by providing a mechanism whereby rotation of an adjustment shaft causes the pendulum to rotate relative to the housing or framework of the inertial sensor through an angle which is significantly smaller than the angle through which the adjustment shaft is rotated. That is to say, the inertial member attitude-adjustment assembly of the invention provides a mechanical reduction mechanism wherein rotation of an input or adjustment shaft through a first angle effects rotation of the inertial member through a significantly reduced angle. The invention thereby overcomes the inherent difficulty in making small angular adjustments of the inertial member (e.g., pendulum) of known inertial sensors wherein the attitude-adjustment knob is directly coupled to the pendulum support structure. In other words, whereas known inertial sensors include an attitude-adjustment knob for adjusting the verticality of the inertial member wherein a one-to-one correspondence exists between the angular displacement of the adjustment knob and the angular displacement of the inertial member, the present invention provides an attitude-adjustment assembly wherein the ratio of the angular displacement of the attitude-adjustment knob to the angular displacement of the inertial member is significantly greater than one. Furthermore, the invention provides particularly novel and advantageous implementations of this concept, which enable the achievement of manufacturing, economy, simplicity, ease of operation and reliability.

In accordance with a first aspect of the invention, the inertial sensor includes a housing, a primary support structure having a base portion mounted in fixed relationship to the housing, an inertial member support portion which is rotatable relative to the base portion, and an attitude-adjustment assembly which allows precise adjustment of the verticality of the inertial member by providing a mechanical arrangement wherein rotation of an input adjustment shaft through any particular angle effects rotation of the inertial member mount with respect to the base through an angle which is less than the angle through which the adjustment shaft is rotated.

In accordance with a preferred embodiment of the invention, the attitude-adjustment assembly includes an operating or adjustment shaft which is rotatable about its longitudinal axis, and wherein rotation of this shaft through any particular angle effects translational movement of the shaft in a direction along its longitudinal axis through a proportional linear displacement. One end of the adjustment shaft is preferably directly coupled to an attitude-adjustment knob which extends outwardly from the housing of the inertial sensor device, and the other end of the adjustment shaft is coupled to an actuator arm which is pivotally connected to the inertial member mount portion of the overall support structure. More specifically, the rotational or longitudinal axis of the adjustment shaft is substantially perpendicular to the axis about which the inertial member mount rotates relative to the base portion of the support structure, and the pivot axis of the actuator arm relative to the inertial member mount portion of the support structure is substantially parallel to that spaced from the pivot axis of the mount portion relative to the base portion of the support structure. The actuator arm generally provides a linear extension between the end of the adjustment shaft and the pivot axis between the actuator arm and the mount portion of the support structure, while allowing free rotation of the adjustment shaft about its rotational axis relative to the actuator arm, which does not rotate with or about the longitudinal axis of the adjustment shaft.

In order to achieve the desired translational movement of the adjustment shaft with respect to its longitudinal axis as it is rotated about its longitudinal axis, the adjustment shaft includes threads which engage an internally threaded member held in a substantially stationary position relative to the housing of the inertial sensor. When the adjustment shaft is rotated, the resulting translational movement of the adjustment shaft along its longitudinal axis is transferred to the actuator arm, which moves substantially linearly and in substantially the same direction as the adjustment shaft. This causes the pivot axis between the actuator arm and the pendulum mount portion of the rigid support structure to move relative to the pivot axis between the pendulum mount portion and the base portion of the rigid support structure, whereby rotation of the inertial member mount portion with respect to the base portion is achieved. In addition to allowing rotation of the adjustment shaft relative to the actuator arm, the connection between the adjustment shaft and the actuator arm must allow the actuator arm to pivot slightly relative to the adjustment shaft, because the movement of the pivot axis between the actuator arm and the mount portion of the support structure traverses an arcuate path about the stationary axis between the mount portion and the base portion of the rigid support structure.

In accordance with another preferred mode of the invention, the inertial member mount portion and inertial member mounted thereon are rotatable with respect to the base portion of the support structure and housing through a relatively large angle to allow the inertial member to be vertically oriented by means of the attitude-adjustment assembly, thereby allowing the inertial sensor device to be mounted on a support surface, such as a dashboard of a vehicle, which is inclined at any of a variety of different angles. More specifically, with respect to the illustrated embodiment of the invention, the inertial sensor device can be mounted with its base or chassis substantially abuttingly adjoined to a support surface whose angle can vary from about −20 degrees to about +80 degrees with respect to a vertical plane while allowing the attitude of the inertial member to be appropriately adjusted in a vertical plane. The degree of vertical adjustability provided allows the inertial member to be appropriately oriented in a vertical plane when the inertial sensor device (i.e., brake controller) is mounted onto the dashboard of most vehicles.

The invention provides the above-mentioned advantages relating to precision vertical adjustability of the inertial member by utilizing a relatively simple and inexpensive attitude-adjustment assembly which translates rotational movement of a control knob to rotation of the inertial member with respect to the housing of the inertial sensor device at a reduced rotational rate relative to the rate at which the knob is turned, so that minor adjustments in the inertial member attitude can be easily achieved as needed or desired.

BRIEF DESCRIPTION OF THE DRAWINGS

FIG. 3 is a fragmentary, front elevational view of the apparatus of FIG. 2, showing the components in assembled relation;

FIG. 4 is a fragmentary, side elevational view of the apparatus showing the support structure on which the inertial member (e.g., pendulum) is mounted and the attitude-adjustment assembly associated therewith;

FIG. 8 is an enlarged perspective view showing details relating to a preferred means for detecting inertial sensor movement.

DESCRIPTION OF THE PREFERRED EMBODIMENT

A preferred example of the inertial sensor or accelerometer of the invention is generally of the type described in U.S. Pat. Nos. 3,981,544 and 5,058,960, which are hereby incorporated by reference herein. The electronic circuitry to be used in the most preferred embodiment is described in co-pending PCT application Ser. No. PCT/US96/13507, filed Aug. 20, 1996, which claims priority based on U.S. provisional application Ser. No. 60/002,540 filed Aug. 21, 1995. Although the particular inertial sensor used in practicing the invention can potentially be of practically any known type, the flexible pendulum type referred to above is shown and described for purposes of illustration, but it will be understood that this should be deemed representative of others, and the particular word "pendulum" used throughout thus understood to mean "inertial member" to the extent appropriate. In addition, relative to particular terms of orientation and the like, for purposes of describing the invention words which relate relative position of one element to another or portions of one element to other portions of that element, such as "upwardly," "downwardly" and the like, should be interpreted with respect to the relationships shown in FIG. 3 unless otherwise indicated, and not understood in any particular limiting manner.

Figure 1:
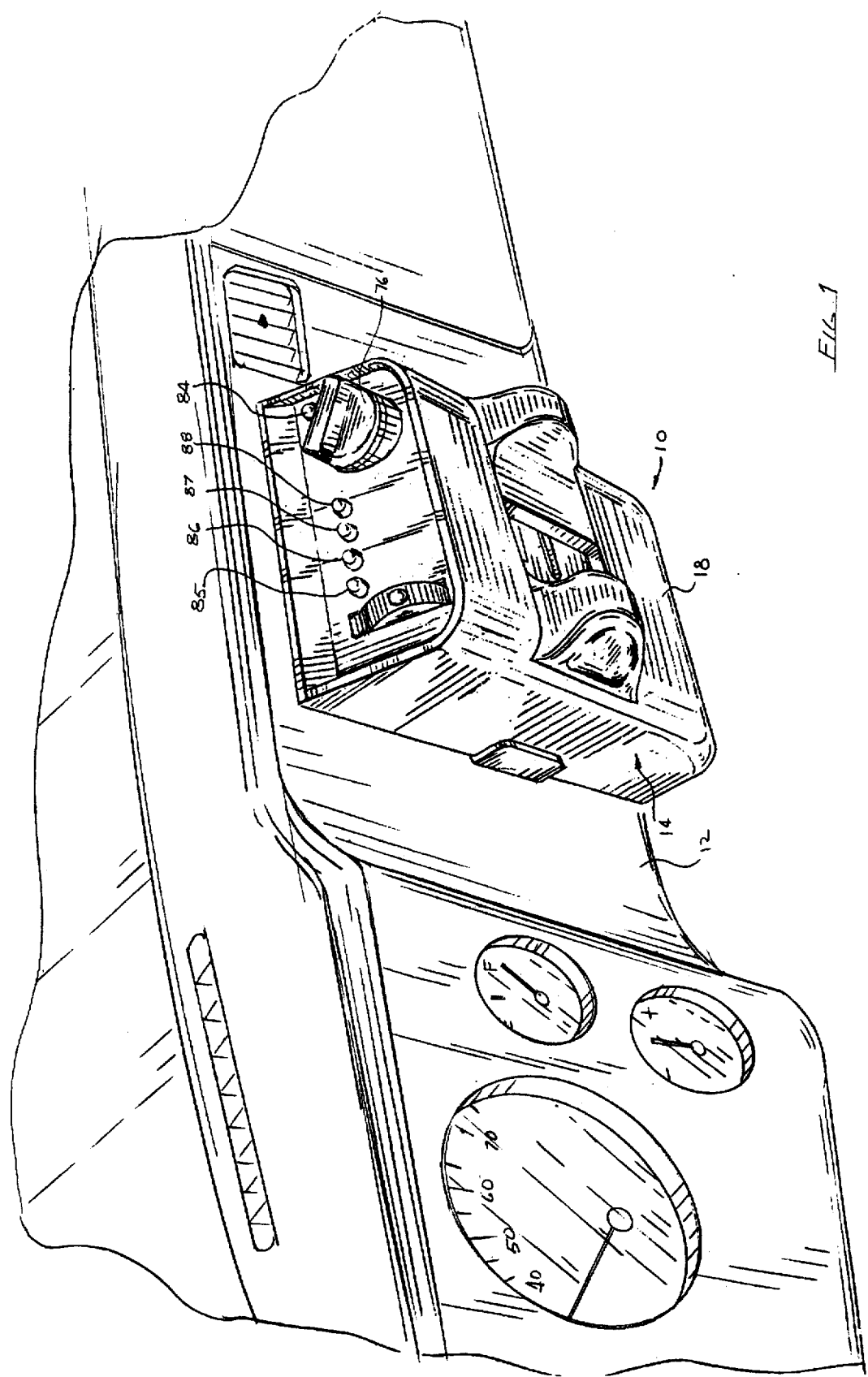
FIG. 1 is a perspective view of a brake controller in accordance with the invention illustratively mounted on a dashboard of a towing vehicle.

Whereas most controllers or actuators for controlling the brakes on trailers or other vehicles which are towed by a vehicle, such as an automobile, pickup truck or the like, are mounted under the dashboard of the towing vehicle, the controller 10 of the invention is specially adapted to be mounted on the front surface of a dashboard 12 generally in a position, shown in FIG. 1. The controller 10 includes a housing 14 comprised of a base or chassis 16 which constitutes the rear of the device as mounted in FIG. 1 (or the top, if horizontally mounted under the dashboard), and a cover or housing member 18 which constitutes the sides, ends and front (or bottom, if horizontally mounted).

The invention relates primarily to the mechanical elements of the inertial sensor apparatus used in the controller 10, and more specifically to refinements in the structural arrangement of the mechanical components which provide a compact, inexpensive pendulum support structure with an improved pendulum attitude-adjustment assembly which facilitates precise adjustment of the nominal or inertially neutral position of the pendulum. More specifically, with reference to FIGS. 2 and 3, the mechanical, as well as the electrical, components of the inertial sensor are mounted on a printed circuit board 20 which is disposed atop the chassis 16. The mechanical components of the inertial sensor include a support structure 22 comprising a base portion 24 having a pair of upstanding, spaced-apart lower support arms 26, 27 and a pendulum mount portion 28 having a pair of spaced-apart upper support arms 29, 30 and a cross member 32 which bridges the upper support arms. The lower portion of each of the upper support arms 29, 30 is pivotally or hingedly connected to the upper portion of a respective one of the lower support arms 26, 27 so that pendulum mount portion 28 is pivotable with respect to the base portion 24. Although a variety of different means may be employed for pivotally connecting the pendulum mount portion to the base portion of the remainder of the support structure, the preferred such hinge or pivot connection is preferably provided by a thin flexible web or living hinge 34 which is preferably integrally formed with the pendulum mount portion and base portion of the support structure. In particular, the support structure is preferably a single molded plastic part and preferably formed of nylon, although various other materials can be suitably employed.

A pendulum 36 is suspended at its upper end from cross member 32 with the bottom end of pendulum 36 being free to move in response to inertial forces. The bottom end of pendulum 36 supports a weight holder 38 which carries a weight 40. The side of weight holder 38 which faces the support structure 22 has a shutter 42 (FIG. 7) which blocks a light beam transmitted from a light source 44 when pendulum 36 is in its normal vertical, resting position. The controller 10 is normally mounted so that chassis 16 faces or abuts the front of the dashboard of a towing vehicle (FIG. 1) so that pendulum 36 will swing toward circuit board 20 upon deceleration of the towing vehicle when the towing vehicle is moving in the forward direction (FIG. 3). Accordingly, upon deceleration of a towing vehicle moving in the forward direction, shutter 42 will move toward the circuit board 20 along with pendulum 36 whereby light from light source 44 will pass through slot 46 in shutter 42 and impinge upon a light detector 48 (FIG. 7) to create a proportional electric signal which acts upon the related inertial sensor circuitry to actuate the brakes of a towed vehicle. The shutter, pendulum, light source, light detector and electrical circuitry are designed to provide a braking response which is appropriate to the rate of deceleration of the towing and towed vehicles. The pendulum 36 is preferably a flexing, multi-layer cantilever beam-type, as described in U.S. Pat. No. 5,058,960. Additionally, the manner in which the weight holder 38 and weight 40 are attached to pendulum 36, the manner in which pendulum 36 is attached to pendulum mount portion 28, and the light source 44 and light detector 48 can generally be as set forth in U.S. Pat. No. 5,058,962. Pendulum mount portion 28 also includes a blocking bar 50 (FIG. 3) which extends between upward support arms 29, 30. Blocking bar 50 is preferably located near the bottom end of pendulum 36 to prevent undue excursion of the pendulum in a direction toward the circuit board 20. Additionally, pendulum mount portion 28 includes a pair of blocking arms 51, 52 which are located adjacent the lower portion of pendulum 36 so as to prevent undue excursion of the pendulum in a direction away from circuit board 20. Blocking bar 50, and especially blocking arms 51, 52 is primarily intended to prevent undue excursion of pendulum 36 during shipping and handling of the inertial sensor, whereby undesirable bending and permanent creasing of the pendulum is prevented.

Pendulum mount portion 28 of support structure 22 also includes, at one side thereof, a mounting flange 54 (FIGS. 2 and 3) having a flange surface which is generally perpendicular to the axis through which pendulum mount portion 28 rotates with respect to base portion 24. Supported on mounting flange 54 and spaced outwardly therefrom is an actuator arm retainer flange 56, which is parallel to flange 54. Retainer flange 56 when viewed from the side is a generally circular-shaped plate having a large V-notch which extends past the center of circular retainer flange 56. Mounting flange 54 includes a circular aperture 58 into which is fitted a cylindrical stub axle 59 which projects laterally from an actuator arm 60 that forms a bell-crank which connects or links an adjustment shaft 62 to pendulum mount portion 28. The axis of rotation defined by circular aperture 58 and cylindrical axle 59 is generally parallel and spaced away from the axis of rotation between pendulum mount portion 28 and base portion 24, so that forces imposed upon mounting flange 54 through aperture 58 by axle 59 will cause pendulum mount portion 28 to pivot with respect to base portion 24.

Adjustment shaft 62 includes a head portion 64 (FIG. 2) which is received within a slot 67 in a connector block 66 secured to arm 60. Head portion 64 is fixedly and preferably integrally attached to one end of adjustment shaft 62. Head-receiving slot 67 retains head portion 64 so that translational movement of adjustment shaft 62 along its longitudinal axis is transmitted to actuator arm 60 and to mounting flange 54 through axle 59, which engages aperture 58. Head portion 64 is retained by the head-receiving slot 67 of connector block 66 so that head portion 64, along with adjustment shaft 62, can freely rotate about the longitudinal axis of adjustment shaft 62, but not shift longitudinally relative to connector block 66. Chassis 16 includes an upstanding post 68 upon which is mounted an anchor retainer 70 having a receiving slot 72 which receives and retains an internally threaded nut-like anchor member 74. Adjustment shaft 62 is externally threaded, with the threads thereof engaging the internal threads of the fixed anchor member 74, whereby rotation of adjustment shaft 62 causes translational movement of the adjustment shaft along its longitudinal axis. The resulting forces are transmitted through actuator arm 60 to pendulum mount portion 28 via the bell-crank formed by axle 59 and the offset journal aperture 58 on mounting flange 54 of pendulum mount portion 28.

Anchor member 74 is retained in receiving slot 72 of anchor retainer 70 in a substantially stationary position, although anchor retainer 70 may be made of at least slightly resiliently deformable material which will allow a minor amount of tilting of anchor member 74 and shaft 62 with respect to anchor retainer 70 to ensure axial alignment and resulting free-running conditions between member 74 and shaft 62 during rotation of flanges 54 and 56 caused by the action of the aforementioned bell crank, which will impart some resultant axial tilting to shaft 62 by carrying the head 64 up and down. The end of shaft 62 which is opposite the end thereof attached to actuator arm 60 is connected to a pendulum attitude-adjustment knob 76 which projects outwardly from housing 18 and is freely rotatable with respect thereto.

The preferred apparatus used to implement the invention is preferably constructed from inexpensive standard, commercially available hardware whenever possible. For example, adjustment shaft 62 and head portion 64 preferably comprise a standard panhead screw, desirably a left-hand threaded screw. Internally threaded anchor member 74 is most preferably a standard hexagonal nut. The externally accessible adjustment knob 76 is most preferably connected to adjustment shaft 62 by means of a hexagonal nut 78 which is fixedly secured (as for example by a strong adhesive such as cyanoxylate) to the end of adjustment shaft 62 opposite the end attached to actuator arm 60. Knob 76 preferably includes a hexagonally shaped recess 77 having a length at least equal to the length of travel of adjustment shaft 62 and its attached hexnut 78 along the longitudinal axis of adjustment shaft 62. The hexagonal shaped recess 77 of knob 76 slidably but nonrotatably receive the hexagonal nut 78, so that knob 76 and hexnut 78 rotate together and nut 78 slides axially within recess 77 as shaft 62 is axially translated. Knob 76, anchor retainer 70 and actuator 60 are all preferably made of nylon or other suitable materials.

Figure 5:
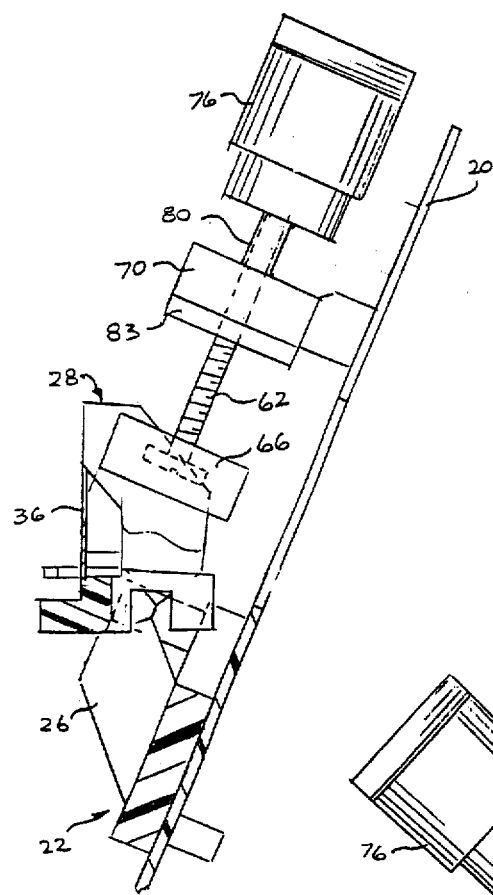
FIG. 5 is a fragmentary, side elevational view of the accelerometer shown partially in section, illustrating the orientation of the pendulum when the controller is mounted on a surface which slopes upwardly and away from a driver.
Figure 6:
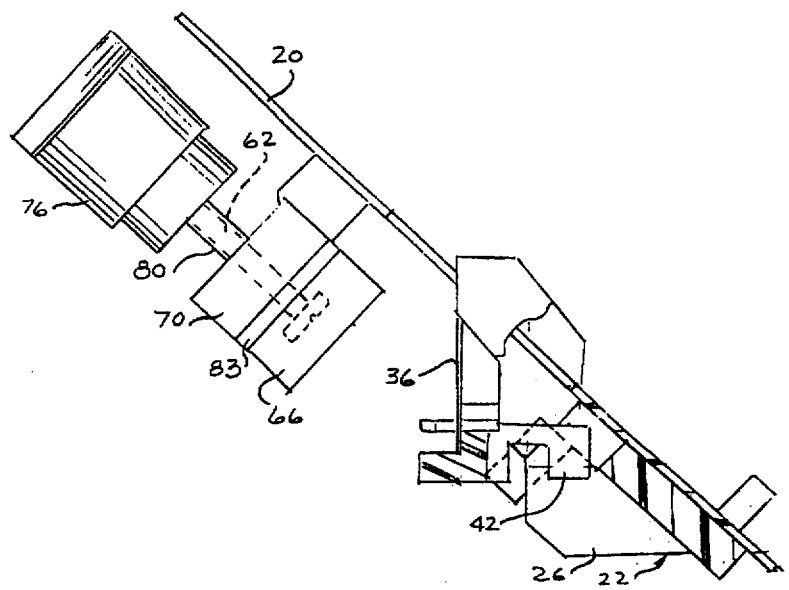
FIG. 6 is a fragmentary, side elevational view like FIG. 5, but showing the orientation of the pendulum when the controller is mounted on a surface which slopes downwardly and away to the driver.
Figure 7:
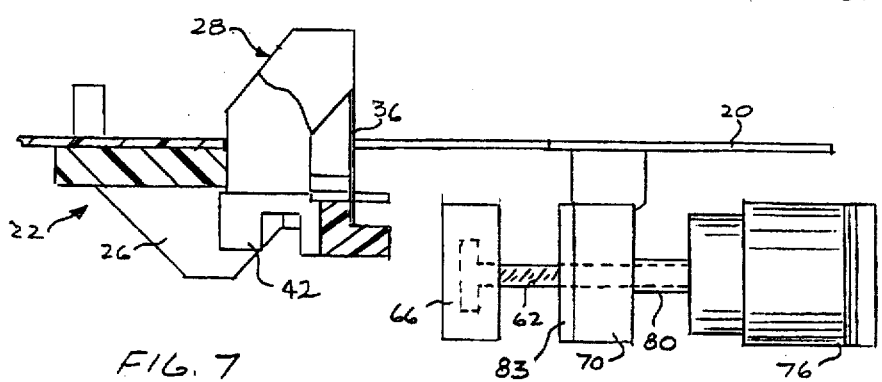
FIG. 7 is a fragmentary, side elevation view like that of FIG. 5, but showing the orientation of the pendulum when the controller is mounted on a surface which is generally horizontal.

As shown in FIGS. 5, 6 and 7, the inertial sensor of the invention can be mounted in a variety of different positions while allowing the pendulum to readily and easily be adjusted to a vertical orientation. For example, FIG. 5 shows the device as mounted on a vehicle dashboard or other such surface which slopes upwardly and away from the driver at an angle of about twenty degrees beyond vertical, FIG. 6 shows it as mounted to a surface which slopes downwardly and away from the driver at a relatively steep angle, and FIG. 7 shows the device as mounted beneath and generally parallel to an essentially horizontal surface. The illustrated device can thus be mounted at essentially any angle between those shown in FIGS. 5 and 7, with the pendulum being readily adjustable to a vertical position, i.e., the attitude-adjustability afforded for the pendulum is over ninety degrees, and preferably at least about one-hundred degrees.

Support structure 22 and the components comprising the inertial member attitude-adjustment assembly include a number of features which prevent or at least impede over-rotation of the adjustment shaft beyond its intended limits. More specifically, a sleeve 80 (FIGS. 2, 3, 5 and 6) is disposed on the adjustment shaft 62 between hexnut 78 and hexnut 74 to prevent or at least restrict over-rotation of left-hand threaded adjustment shaft 62 in a counterclockwise direction, so that rotation of the upper portion of pendulum 36 away from the printed circuit board 20 is limited to the position generally indicated in FIG. 6. Likewise, the extent to which adjustment shaft 62 can be rotated in the clockwise direction is limited, as shown in FIG. 6, by a pair of spaced, parallel walls 82, 83 (see FIG. 2) which project laterally from anchor retainer 70 and are engaged in flush abutting relation by the head-receiving connector member 66 of actuator arm 60 to prevent or at least restrict further movement of actuator arm 60 in a direction toward knob 76.

As shown in FIG. 4, base portion 24 of support structure 22 preferably includes a plurality of integral, resilient mounting clips 25 which project through circuit board 20 to retain support structure 22 on circuit board 20 preferably by means of a snap-in type engagement.

As a specific example of components used in the illustrated embodiment of the invention, a 6-32 panhead machine screw having left-handed threads and a length of 1.25 inches is utilized to achieve a 32:1 reduction in the amount of angular displacement or rotation of shaft 62 relative to the amount of angular displacement or rotation of pendulum mount portion 28 with respect to base portion 24. This means that about eight complete revolutions of knob 76 are required to cause the pendulum mount portion 28 to rotate ninety degrees with respect to the base portion 24 and, in turn, that knob 76 must be rotated a full thirty-two degrees to bring about one degree of adjustment in the attitude of the pendulum. Accordingly, very convenient operation is provided by which extremely fine adjustments in the pendulum attitude can be easily achieved.

With respect to the basic operation of the inertial sensor apparatus, after the controller 10 is properly mounted and electrically connected to the towing vehicle, the pendulum attitude is adjusted with respect to verticality. This is done by rotating knob 76 until a light-emitting diode 84 lights up to signal that the pendulum 36 is vertically oriented, as particularly discussed in the aforementioned copending U.S. Provisional patent application Ser. No. 60/002,540. In this regard, users of such controllers often prefer to orient the pendulum 36 or other such inertial sensor element in a position which is at least slightly off the true vertical in order to select a desired inertial response. That is, one may use such settings to select a relative lag between the onset of towed vehicle braking following initial braking of the tow vehicle, thereby providing a particular mode of system response which is preferred by certain individuals. The controller 10 also includes a bank of light emitting diodes (LEDs) 85, 86, 87 and 88 which light up to indicate the amount of braking current being applied to actuate the brakes of the towed vehicle, i.e., the number of LEDs 85–88 which are lighted is proportional to the amount of deceleration and the amount of braking required.

Figure 2:
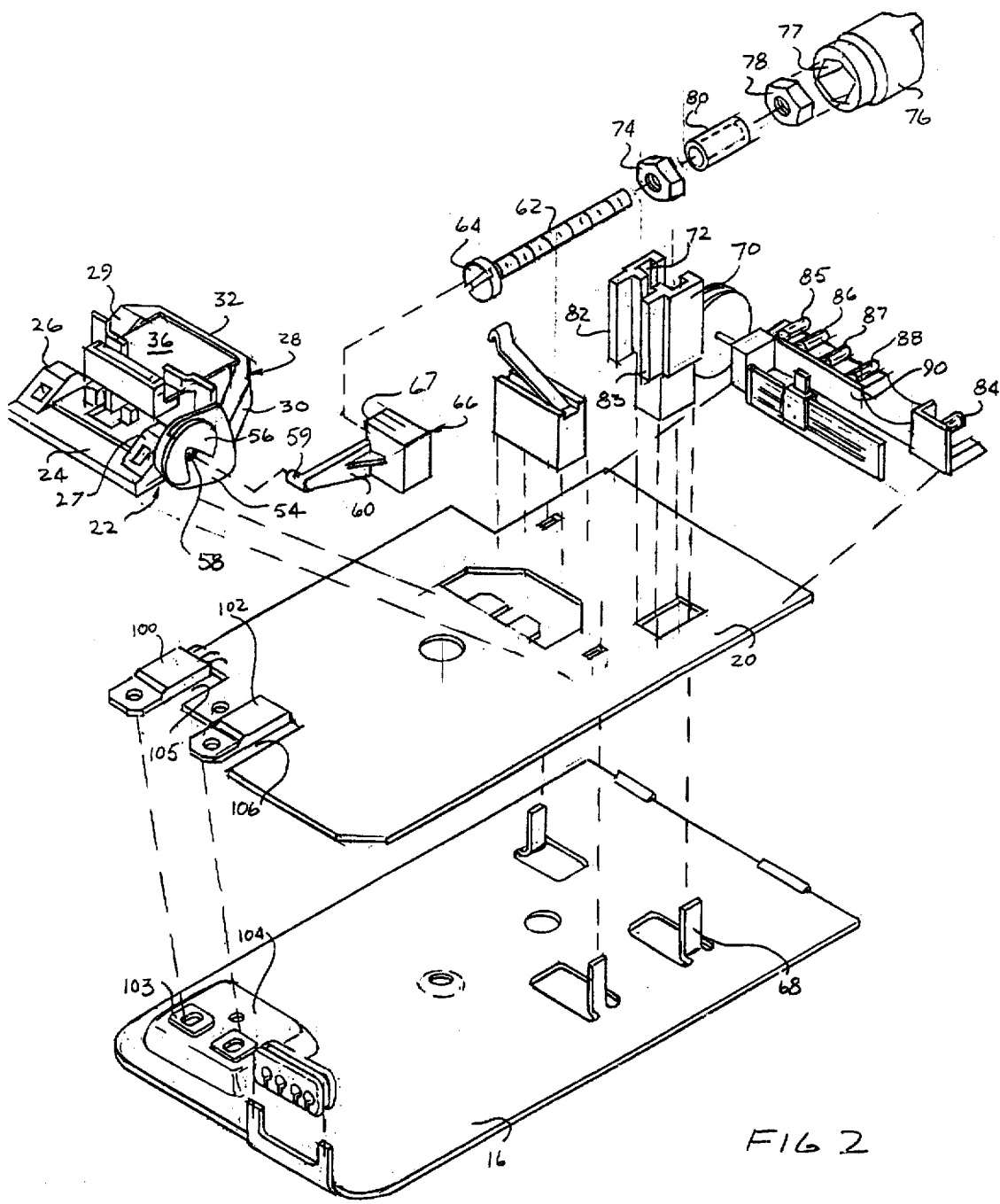
FIG. 2 is an exploded perspective view illustrating the assembly of the various components comprising the inertial sensor and its mounting apparatus.

A further aspect of the apparatus disclosed herein is an integrally molded light-dam/LED-locator board 90 (FIGS. 2 and 3) which is provided to properly position the above-mentioned LEDs 84–88 on printed circuit board 20 and to shield light detector 48 from any stray light transmitted from or through the LEDs, which is of considerable importance to the proper functioning of the electro-optical part of the device, and thus the basic operation of the controller 10. Furthermore, the presence of this structure greatly facilitates ease and accuracy of assembly during manufacture, and thus helps ensure high quality at lower expense. In addition, the invention provides an effective and advantageous way to mount the Field Effect Transistors (FETs) 100, 102, which comprise the preferred output current control switch components. As best shown in FIG. 2, these are preferably mounted upon an embossment 104 on metal chassis 16, at slots or cut-outs 105, 106 in circuit board 20, in order to more effectively conduct heat away from the FETs than if they were mounted to the circuit board itself. A FET which handles as much current as brake-actuators typically may draw (i.e., at least on the order of twenty-five to thirty amps), if mounted directly to a circuit board in a small electrical device having a substantially complete enclosure without any forced-air circulation, would tend to generate more heat than can be effectively dissipated, which results in overheating of the FET. Such overheating causes the FET and the electrical device in which it is utilized to function erratically or to fail to perform properly. The inventor has discovered that this problem can be overcome by mounting the FETs in essentially direct contact with metal chassis 16, i.e., with the body of the FET in thermal contact, or at least in very close proximity to the embossment. In this manner, the chassis 16 serves as an effective heat sink which quickly conducts heat away from the FETs where it can be more effectively transferred to the surroundings by conduction from the base to the structure on which it is supported and by free convection to the surrounding air. In the most preferred embodiment, a thin layer or sheet 103 of silicone or the like is interposed between the FET body and embossment 104 to provide electrical isolation while maintaining good heat transfer therebetween.

The above description is considered that of the preferred embodiments only. Modification of the invention will occur to those skilled in the art and to those who make and use the invention. Therefore, it is understood that the embodiments shown in the drawings and described above are merely for illustrative purposes and are not intended to limit the scope of the invention, which is defined by the following claims.

The embodiments of the invention in which an exclusive property or privilege is claimed are defined as follows:

1. An inertial sensor, comprising:

a housing;

a flexible pendulum;

a rigid support structure having a base portion and a pendulum mount portion pivotally attached to said base portion by a torsionally flexible structure, said base portion being secured at a fixed location and at a fixed attitude relative to said housing, said pendulum being attached at one end to said pendulum mount portion, another end of said pendulum being free to move in response to inertial forces; and a pendulum attitude adjustment assembly which permits precise adjustment of the verticality of said pendulum, said adjustment assembly including an adjustment shaft operably coupled to said pendulum mount portion at a point spaced from said torsionally flexible structure to achieve rotation of said pendulum mount portion with respect to said base portion by torsionally flexing said member through a first angle when said adjustment shaft is rotated through an angle greater than said first angle.

2. The inertial sensor of claim 1, wherein said adjustment shaft has a longitudinal axis about which it is rotatable, and wherein said adjustment shaft undergoes translational movement along the longitudinal axis thereof when rotated about its longitudinal axis.

3. The inertial sensor of claim 1, wherein said pendulum mount portion is rotatable with respect to said base portion through an angle in excess of ninety degrees.

4. The inertial sensor of claim 1, wherein said pendulum mount portion is pivotally connected to said base portion by a living hinge.

5. An inertial sensor, comprising:

a housing;

a flexible pendulum;

a rigid support structure having a base portion and a pendulum mount portion pivotally attached to said base portion, said base portion being secured at a fixed location and at a fixed attitude relative to said housing, said pendulum being attached at one end to said pendulum mount portion, another end of said pendulum being free to move in response to inertial forces; and a pendulum attitude adjustment assembly which permits precise adjustment of the verticality of said pendulum, said adjustment assembly including an adjustment shaft operably coupled to said pendulum mount portion to achieve rotation of said pendulum mount portion with respect to said base portion through a first angle when said adjustment shaft is rotated through an angle greater than said first angle said adjustment shaft being threaded and engaging a complementary threaded member which is retained at a substantially fixed position with respect to said housing.

6. The inertial sensor of claim 5, wherein said threaded member is a nut which is non-rotatably captured in a slot on a retainer connected to said housing.

7. The inertial sensor of claim 6, wherein said adjustment shaft includes a head portion integrally attached at one end; and an arm connecting said adjusting shaft with said pendulum mount portion, said arm including a slot for receiving said head portion of said adjustment shaft, and said arm being pivotally attached to said pendulum mount portion.

8. The inertial sensor of claim 7, further comprising a knob which projects outwardly through said housing and is directly coupled to said adjustment shaft so that said knob and said adjustment shaft rotate together.

9. The inertial sensor of claim 8, wherein said knob includes a hexagonal shaped recess whose walls are engaged by a hexagonal nut fixedly secured to said adjustment shaft.

10. The inertial sensor of claim 9, wherein said base portion of said support structure is secured to a printed circuit board mounted within said housing.

11. The inertial sensor of claim 10, wherein said base portion of said support structure includes a plurality in integral, resilient mounting clips which project through said circuit board to retain said support structure thereon.

12. The inertial sensor of claim 11 further comprising a sleeve disposed on said adjustment shaft between said nut engaging knob and said nut captured in said slot of said retainer, whereby over-rotation of said shaft in a particular direction is prevented or at least restricted by said sleeve.

13. The inertial sensor of claim 12, wherein said retainer is engageable by said arm to prevent or at least restrict over rotation of said adjustment shaft in a particular direction.

14. The inertial sensor of claim 7, wherein said pendulum mount portion includes a mounting flange having a circular aperture, and said arm includes a cylindrical axle which projects into said aperture to provide said pivotal attachment of said arm to said pendulum mount portion.

15. The inertial sensor of claim 14, further comprising a retainer flange integral with said pendulum mount portion, said arm being retained between said mounting flange and said retainer flange.

16. An inertial sensor, comprising:

a housing;

a flexible pendulum;

a rigid support structure having a base portion and a pendulum mount portion pivotally attached to said base portion through a living hinge, said base portion being secured at a fixed location and at a fixed attitude relative to said housing, said pendulum being attached at one end to said pendulum mount portion, another end of said pendulum being free to move in response to inertial forces; and a pendulum attitude adjustment assembly including an externally threaded adjustment shaft having a head portion, an internally threaded member which is retained at a substantially stationary position with respect to said housing, and an arm connecting said adjustment shaft with said pendulum mount portion, said external thread of said adjustment shaft engaging said internal thread of said internally threaded member, said arm including a slot for receiving said head portion of said adjustment shaft and an axle which is pivotally attached to said pendulum mount portion, rotation of said adjustment shaft causing rotation of said pendulum mount portion with respect to said base portion, the ratio of the angular displacement of said adjustment shaft to the angular displacement of said pendulum mount portion with respect to said base portion being greater than one.

17. The inertial sensor of claim 16, wherein said pendulum mount portion is rotatable with respect to said base portion through an angle in excess of ninety degrees.

* * * * *